United States Patent [19]

Adamek et al.

[11] Patent Number: 4,709,933
[45] Date of Patent: Dec. 1, 1987

[54] TEMPERATURE TRANSIENT RESISTANT SEAL

[75] Inventors: Frank C. Adamek, Pasadena; Charles D. Bridges, Houston, both of Tex.

[73] Assignee: Vetco Gray Inc., Houston, Tex.

[21] Appl. No.: 39,060

[22] Filed: Apr. 16, 1987

[51] Int. Cl.⁴ ............................................. F16J 15/06
[52] U.S. Cl. ................................ 277/167.5; 277/236; 277/22
[58] Field of Search ............ 277/167.5, 207 A, 207 B, 277/236, DIG. 2, DIG. 22; 285/917

[56] References Cited

U.S. PATENT DOCUMENTS 3,197,218  7/1965  Coulter ............................. 277/167.5
3,414,273  12/1968  Sumner ........................ 277/207 A X
4,361,331  11/1982  Kohler ............................. 285/917 X
4,452,462  6/1984  Karr ............................. 277/167.5 X

FOREIGN PATENT DOCUMENTS 845130  7/1952  Fed. Rep. of Germany ...... 277/236

Primary Examiner—Robert S. Ward
Attorney, Agent, or Firm—Edward L. Kochey, Jr.; William H. Montgomery

[57] ABSTRACT

A cylindrical seal ring 20 has an inwardly extending rib 60, and upwardly 66 and downwardly 82 extending cantilever arms, each carrying outwardly facing seal surfaces 68, 84. The cantilever arms preload the seals and support the seals while providing flexibility between the seal areas and the rib 60. Temperature transients are readily accommodated.

5 Claims, 4 Drawing Figures

TEMPERATURE TRANSIENT RESISTANT SEAL

TECHNICAL FIELD

The invention relates to high pressure seals for circumferential joints of a pressure vessel, and in particular to a temperature transient resistant seal.

Fire safe seals have been suggested in the past which retain sealing effectiveness at abnormally high temperatures. Little attention has been given, however, to the temperature transient problem. In the usual fire situation this may be a slow transient, while in others or with internal chemical reactions this may be an extremely rapid transient. Depending on mass, location and exposed surface of each part, each will expand differently. Such differential expansion may lead to loss of sealing effectiveness.

On occasions where the contents of a pressure vessel experience a rapid rise in temperature, it is important that the seal be maintained. Escape of gases at such a time can not only be dangerous to the surrounding environment, but a flow of the hot gases could result in catastrophic local failure of the structure.

U.S. Pat. No. 4,477,093 shows a "T" shaped sealing means placed within a circumferential surface to be sealed. The base of the "T" is an outwardly extending rib. Outwardly facing coplanner seals are located on the arms of the "T".

DISCLOSURE OF THE INVENTION

A temperature resistant seal apparatus seals a circumferential joint in a pressure vessel. The pressure vessel has an upper cylinder, a lower cylinder, and means for securing the two cylinders against relative axial movement. The pressure vessel has inwardly facing seal surfaces on each cylinder.

A cylindrical seal ring has an inwardly extending rib with upwardly and downwardly extending cantilever arms, each carrying an outwardly facing seal surface which forms an interference fit with the complementary seal surface on a cylinder. Each cantilever arm joins the rib with a smooth radius, and the length of each arm is greater than its minimum thickness.

The diameter of each seal surface may be different to provide axial force under pressure, thereby retaining the seal against a shoulder. The pressure vessel includes a shoulder to abut the seal under the unbalanced force condition.

BEST MODE FOR CARRYING OUT THE INVENTION

Figure 1:
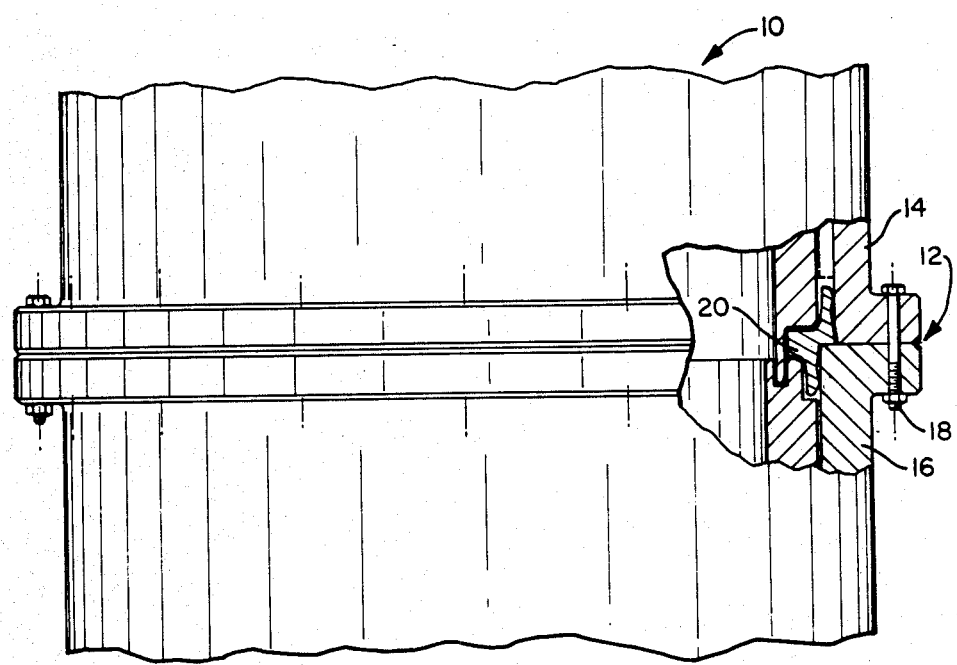
FIG. 1 is a partial view of the pressure vessel and the seal assembly.

FIG. 1 illustrates the general arrangement showing a pressure vessel 10 such as a thermal reaction chamber or heat exchanger having a circumferential joint 12 between an upper cylinder 14 and a lower cylinder 16. A plurality of bolts 18 secure the upper and lower cylinders against relative axial movement. The connection whether bolted or otherwise secured need not prevent any axial movement, but need only limit it to a sealable range. One of the advantages of this seal is its ability to tolerate some axial movement. A circumferential seal ring 20 is located inside the joint 12 to seal against inside pressure.

Figure 2:
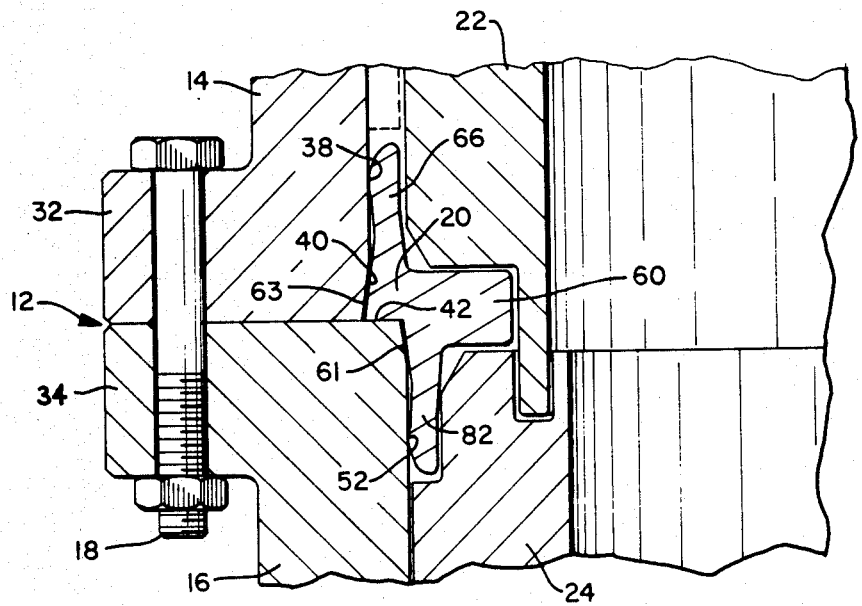
FIG. 2 is a section through the seal area.

FIG. 2 illustrates this same seal assembly in greater detail. In this view there is shown internal insulation 22 and 24 located inside the pressure vessel 10.

The upper cylinder 14 includes an outwardly extending flange 32 containing a plurality of bolt holes for receiving bolts 18. There is a flange 34 on cylinder 16 mating with the upper flange 32. The upper cylinder includes an inwardly facing seal surface 38. A tapered section 40 is provided to facilitate assembly with the seal ring 20.

The lower cylinder 16 includes near its upper end an inwardly facing seal surface 52. A taper 61 provides ease of entrance for the seal ring. The lower cylinder also includes an upwardly facing shoulder 42 which serves as an abutting surface for the seal ring.

Figure 3:
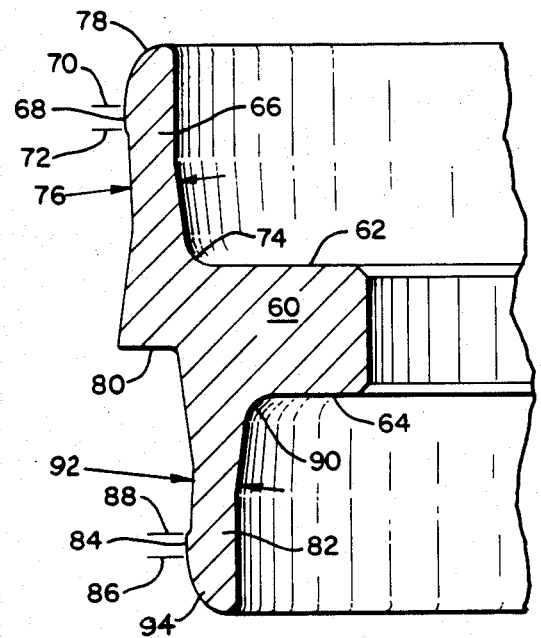
FIG. 3 is a detail of the seal ring of FIG. 4.

Seal ring 20 is shown in more detail in FIG. 3, and includes inwardly extending rib 60 with exposed upper surface 62 and exposed lower surface 64. Upwardly extending cantilever arm 66 integral with the rib extends from the outboard portion of the rib. This arm contains an outwardly facing seal surface 68 from elevation 70 to elevation 72. A smooth radius 74 is provided where the arm joins the rib. The length of the arm from surface 62 of rib 60 to elevation 70 of the seal surface is greater than the minimum thickness 76 of the arm. While the seal ring 20 is shown as cylindrical, it is understood that slight variations therefrom, such as conical, would be acceptable.

A taper 78 on the seal ring provides ease of entrance of seal ring 20 into the upper cylinder 14. A downwardly facing shoulder 80 is located so as to abut the upwardly facing abutting surface 42 of the lower cylinder.

A downwardly extending cantilever arm 82 also integral with the rib extends from the outboard portion of the rib. This arm contains an outwardly facing seal surface 84 from elevation 86 to elevation 88. A smooth radius 90 is provided where the arm joins the rib. The length of the arm from rib surface 64 to elevation 88 of the seal surface is greater than the miminum thickness 92 of the arm.

A taper 94 on the seal ring provides ease of entrance of seal ring 20 into the lower cylinder. The diameter of seal surface 68 is greater than the diameter of seal surface 84. Accordingly, pressure existing within the pressure vessel acts on a differential area urging the seal ring downwardly against shoulder 42. This insures accurate placement of the seal ring 20 during critical periods.

The inwardly extending rib 60 supplies mass and stability to the cantilever arms and seals. It operates through the cantilever arms to prevent buckling of the seal area, and to provide additional loading against the seal surface. The diameter of the ring in the seal area is selected to provide a high interference fit against the seal surface of the pressure vessel. The force of the ring adjacent the seal surface is supplemented by the force from the cantilever arm, thereby increasing the sealing force. Even if the elastic limit of the material in the area of the seal is exceeded because of tolerancing or installation problems, the rib and cantilever arm prevent buckling, and the contribution from the arm to the sealing force is simply increased.

With the high sealing forces experienced, all seal areas should be coated with one of the known antigalling materials. The length of the cantilever arm should be significant since the pressure acting against the inner surface of the arm supplements the sealing force when under pressure. The distance between the surface of rib 60 and the sealing surface should be greater than the minimum thickness of the arm to permit any radial differential expansion between the rib and seal area to be absorbed. Generous radii 74 and 90 are supplied to avoid stress concentrations at the rib to arm junction. With the rib extending inwardly such a radius may be supplied without interfering with the design of the pressure vessel joint.

When a rapidly increasing temperature occurs inside the pressure vessel, it will first be experienced near the insulation interface, and accordingly in the rib area. The massive rib first absorbs the heat and transmits it uniformly toward the seal area. Exposed upper surface 62 and exposed lower surface 64 facilitate heat transfer to the rib. The generous radius facilitates this heat transfer. Should the heat be a local occurance around the circumference, as is most likely, the rib transfers the heat circumferentially, thereby avoiding a high local differential temperature in the seal area. This contributes to the uniformity of sealing. The length of the arms being greater than the minimum thickness of the arms contributes to this uniformity.

As shown in FIG. 2, there is a limited radial clearance between the outer edge 63 of the seal ring 20 and the inner surface of the pressure vessel in the area near the rib. As an internal increasing temperature transient occurs, the seal will heat first because of its location and because of its smaller mass. The ring therefore expands relative to the pressure vessel during the transient. The rib area expansion relative to the pressure vessel is limited by this clearance. Overstraining of the seal area is thereby minimized.

During such a transient the central portion of the ring will move into contact with the pressure vessel. The seal areas were already in contact with the vessel. A deflection of the cantilever must occur to absorb the differential movement. This should not exceed the elastic limit to the extent that later precompression of the seal area is lost. Since the cantilever is neither a constant cross section beam with maximum bending stress at the base nor a triangular beam of a constant stress pattern, calculations must be made on the particular structure. Permanent strain may be permitted in some outer fibers, but sufficient force should be retained after the transient. A radial clearance of about 2 to 3 percent of the distance from the base of each cantilever to the seal area is generally appropriate.

Should the heat come from the outside, the pressure vessel expands first, and the seal depends on the stored strain to follow the relative movement.

Figure 4:
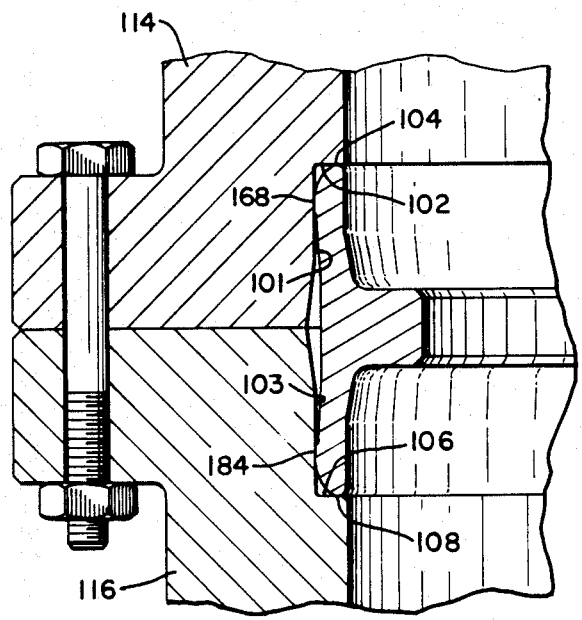
FIG. 4 is a section through an alternate seal assembly arrangement.

FIG. 4 shows an alternate embodiment wherein the outwardly facing seal surface 168 of seal ring 20 is of the same diameter as outwardly extending seal surface 138. No pressure unbalance will be available to retain the ring in position. A recess 101 in the upper cylinder 114 and a recess 103 in the lower cylinder 116 cooperate to position and retain the seal ring 120. Downwardly facing shoulder 102 of upper cylinder 114 abuts the upper edge 104 of seal ring 120 while upwardly facing shoulder 106 of lower cylinder 116 abuts the lower edge 108 of the seal ring.

We claim:

1. A temperature transient resistant seal apparatus for sealing a circumferential joint in a cylindrical pressure vessel comprising:

said pressure vessel including an upper cylinder, a lower cylinder, means for securing said upper and lower cylinders against relative axial movement, an inwardly facing upper seal surface on said upper cylinder, and an inwardly facing lower seal surface on said lower cylinder;

a substantially cylindrical seal ring including an inwardly extending rib having exposed upper and lower surfaces;

an upwardly extending first cantilever arm of substantially cylindrical form, integral with an outboard portion of said rib;

a first outwardly facing seal surface located on an upper portion of said first cantilever arm;

a downwardly extending second cantilever arm of substantially cylindrical form, integral with an outboard portion of said rib;

a second outwardly facing seal surface located on a lower portion of said second cantilever arm;

said cantilever arms each joining said rib with a smooth radius, whereby stress concentrations are avoided and conduction of heat from said rib to said cantilever arms is facilitated;

said first seal surface engaging said inwardly facing surface on said upper cylinder;

said second seal surface engaging said inwardly facing surface on said lower cylinder;

the length of each cantilever arm from rib to said outwardly facing seal surface being greater than the minimum thickness of the respective cantilever arm.

2. An apparatus as in claim 1:

the relaxed outside diameter of said first seal surface being greater than the inside diameter of said upper seal surface;

the relaxed outside diameter of said second seal surface being greater than the inside diameter of said lower seal surface;

whereby the first and second seal surfaces are pre-energized with an interference fit as assembled.

3. An apparatus as in claim 2:

said first and second seal surfaces outwardly extending.

4. An apparatus as in claim 2:

said first and second seal surfaces being of different diameters;

a seal ring shoulder on said seal ring facing toward the lesser diameter;

a pressure vessel shoulder on said pressure vessel facing opposite said seal ring shoulder; and said seal ring shoulder and said pressure vessel shoulder in abutting relationship.

5. An apparatus as in claim 2:

said seal ring in the area of said rib having a radial clearance from said pressure vessel of less than 3 percent of the distance from said rib to either seal surface.

* * * * *